United States Patent [19]

Saga

[11] 3,873,501

[45] Mar. 25, 1975

[54] 1,2-EPOXY RESIN CURED WITH 3(β-METHYL-2-BUTENYL)-5-METHYL-1,2,3,6-TETRAHYDROPHTHALIC ANHYDRIDE

[75] Inventor: Motoo Saga, Ami-Machi, Japan

[73] Assignee: Mitsubishi Petrochemical Co. Ltd., Tokyo, Japan

[22] Filed: Apr. 22, 1974

[21] Appl. No.: 462,926

Related U.S. Application Data

[63] Continuation of Ser. No. 295,737, Oct. 6, 1972, abandoned.

[52] U.S. Cl......... 260/47 EA, 260/2 EA, 260/2 EC, 260/47 EC, 260/59, 260/75 EP, 260/78.4 EP, 260/346.6, 260/830, 260/831, 260/835

[51] Int. Cl............................................ C08g 30/12

[56] References Cited
UNITED STATES PATENTS 3,296,202   1/1967   Schmitz-Josten et al............ 260/47

OTHER PUBLICATIONS

Handbook of Epoxy Resins, Lee et al., 1967, (pp. 12–9 to 12–11).

Primary Examiner—Melvin Goldstein
Assistant Examiner—T. Pertilla
Attorney, Agent, or Firm—Oblon, Fischer, Spivak, McClelland & Maier

[57] ABSTRACT

An epoxy resin composition which comprises an epoxy resin containing at least one epoxy group and a hardener such as 3( β-methyl-2-butenyl)-5-methyl-1,2,3,6-tetrahydrophthalic anhydride or hydrogenated and halogenated derivatives thereof.

3 Claims, No Drawings

1,2-EPOXY RESIN CURED WITH 3(B-METHYL-2-BUTENYL)-5-METHYL-1,2,3,6-TETRAHYDROPHTHALIC ANHYDRIDE

This is a continuation of application Ser. No. 295,737, filed Oct. 6, 1972, and now abandoned.

BACKGROUND OF THE INVENTION

1. Field of the Invention

This invention relates to epoxy resin compositions which contain a novel hardener.

2. Description Of The Prior Art

Heretofore, various acid anhydride derivatives have been known and widely used as effective hardeners for epoxy resins. In general, acid anhydride hardeners have a number of desirable characteristics such as the non-toxic quality of amine type hardeners; the hardening under exothermic reaction conditions is low; the volume contraction of the products while hardening is small; and the final products have good electric and thermal properties. Accordingly, acid anhydride hardeners have been used for the manufacture of large size molding products and for impregnating molding products. However, most of the acid anhydride hardeners have high melting points and are solid at ambient temperatures. Thus, conventional acid anhydride hardeners have the disadvantages of inferior processibility, of requiring high temperature hardening and large amounts of filler cannot be mixed with the hardeners.

SUMMARY OF THE INVENTION

Accordingly, it is an object of this invention to provide a novel epoxy resin composition which has an excellent processibility, a relatively low temperature hardening and is compatible with a large amount of filler.

This object and other objects of this invention can be attained by admixing the hardener, 3-($\beta$-methyl-2-butenyl)-5-methyl-1,2,3,6-tetrahydrophthalic anhydride, with an epoxy resin.

DESCRIPTION OF THE PREFERRED EMBODIMENTS 3-($\beta$-Methyl-2-butenyl)-5-methyl-1,2,3,6-tetrahydrophthalic anhydride (hereinafter referred to as MBTHP) is a novel compound which can be prepared by the addition reaction of maleic anhydride with 2,6-dimethyl-1,3,6-octatriene (hereinafter referred to as DMOT) as shown below. DMOT is obtained by the linear dimerization of isoprene.

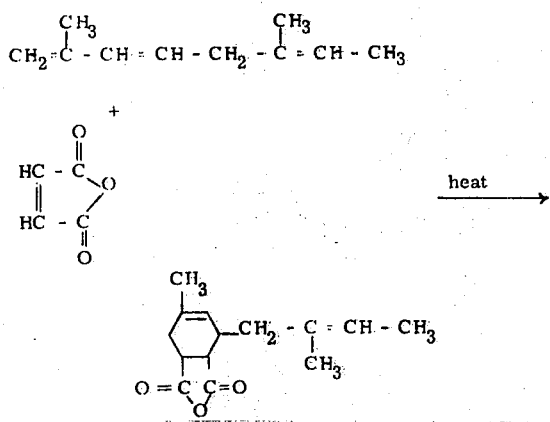

The hardener, 3-($\beta$-methyl-2-butenyl)-5-methyl-1,2,3,6-tetrahydrophthalic anhydride, is a liquid at normal temperatures and has a viscosity of about 5.0 poise at 25°C and a viscosity of about 1.1 poise at 50°C. MBTHP can be purified by distillation and has a boiling point of 155°–156°C/0.8 mm Hg and a refractive index of $n_D^{25} = 1.5042$.

In the addition reaction of DMOT and maleic anhydride, Diels Alder reaction conditions are normally employed. Preferably, an equimolar quantity or a small excess of maleic anhydride relative to DMOT is employed (when a mixture of DMOT isomers is used as the starting material, an equimolar quantity of 2,6-dimethyl-1,3,6-octatriene to maleic anhydride is used) in the reaction. The reaction may be conducted in the presence of a suitable solvent such as an aliphatic hydrocarbon, an aromatic hydrocarbon, and an alicyclic hydrocarbon, such as n-heptane, benzene, toluene, xylene and cyclohexane. The reaction temperatures employed range from 0°–150°C in the absence of a solvent and from 0°C. to the boiling point of the solvent when the reaction is conducted in the presence of a solvent. Reaction temperatures preferably range from 50°–80°C., and especially 60°–70°C.

Usually, a mixture of a cyclic dimer of 2,4-dimethyl-4-vinyl-1-cyclohexene (hereinafter referred to as DMVCH) and the chain dimer of DMOT is produced by the dimerization of isoprene in the presence of Ziegler type catalysts. When maleic anhydride is reacted with a mixture of DMVCH and DMOT, DMOT selectively reacts to produce MBTHP. Thus, when the reaction mixture is distilled to remove unreacted DMVCH, the residual product is substantially MBTHP. The residual product can be used as the hardener of the composition of this invention. The hardener, MBTHP, can be incorporated in the composition alone. However, it can be used together with another hardener or a hardening accelerator.

It is especially preferred to admix MBTHP with an epoxy resin together with a hardening accelerator. As mentioned earlier, MBTHP is liquid at normal temperatures. Thus, it is very easy to admix MBTHP with epoxy resin additives and fillers, and the composition is easy to process as well. MBTHP does not sublime as do the conventional acid anhydride hardeners and it has good compatibility with a hardening accelerator and other hardeners. The composition of epoxy resin-MBTHP of this invention does not separate from solution as a film or precipitate upon aging at room temperature. The cured products of the composition have excellent mechanical properties (as shown in Table 1 of Example 1). The hardening accelerators used in the epoxy resin composition of this invention are preferably tertiary amines, but other types of hardening accelerators can be used. Hydrogenated and halogenated derivatives of the unsaturated bond of MBTHP may also be used as hardeners for the epoxy resins.

The epoxy resins of this invention can be various types of polyepoxide compounds which contain at least one epoxy group per molecule. Suitable epoxy resins include polyglycidyl ethers of polyvalent phenols, and polyvalent alcohols. The polyglycidyl ethers of polyvalent phenols can be derived from mono-ring phenols such as resorcinol, catechol, hydroquinone or 2,2-bis(4-oxyphenyl)propane (bishpenol A); bis(4-oxyphenylmethane(bisphenol F); novolaks, resols and mixtures thereof. The polyglycidyl ethers of polyvalent alcohols can also be derived from polyvalent alcohols such as ethyleneglycol, glycerine, polyethyleneglycol, polypropyleneglycols and other alcohols.

Others types of polyepoxide compounds can be those prepared by reacting epichlorohydrin with a compound possessing an active hydrogen atom such as amines, polyamines, hydrazides, acid amides, sulfonyl amides and polycarboxylic acid derivatives.

Still other types of polyepoxide compounds can be epoxide esters of an unsaturated alcohol and an unsaturated carboxylic acid such as 2,3-epoxybutyl 3,4-epoxy cyclohexanoate, 3,4-epoxycyclohexyl 4,5-epoxy octanoate, and 2,3-epoxycyclohexyl methyl epoxy cyclohexane carboxylate, and epoxide polyethylene hydrocarbons such as the epoxide of 2,2-bis(2-cyclohexenyl) propane, and the epoxide of vinylcyclohexane and cyclopentadiene. Resins containing an epoxy resin as the main component can be used for the preparation of the compositions of this invention. Suitable resins include phenol resins, polyester resins and other resins possessing suitable compatibility with the epoxy resins.

The amounts of hardener employed in the compositions of this invention range from 0.1–10 mole, preferably 0.5–2 mole, especially 0.5–1.0 mole of the hardener per mole of epoxy in the epoxy resin. A particularly remarkable effect is noted when 0.9–1.1 mole of the hardener is employed per mole of epoxy in the epoxy resin.

One example of the procedure employed to prepare MBTHP is described as follows:

Preparation of MBTHP

A 26.7 g (0.272 mole) quantity of maleic anhydride was dissolved in 68 ml of benzene at an elevated temperature. The solution was heated to 60°–65°C. A 100 g quantity of a mixture of DMOT and DMVCH (37 g (0.272 mole) DMOT content) was added dropwise to the solution of the anhydride. The temperature of the reaction mixture increased depending upon the rate of addition of the DMOT mixture. Accordingly, the temperature of the reaction mixture was maintained at a temperature lower than 70°C by external cooling or by adjusting the rate of addition of DMOT. Over a period of about 40 minutes, the addition of the mixture of DMOT and DMVCH was completed, and the mixture was continuously stirred for an additional 2 hours at 60°–65°C. After the reaction, the benzene solvent was evaporated and the residue was heated to separate 57.3 g of DMVCH as a fraction boiling from 161° to 162°C. The residue was distilled under reduced pressure to yield 58.3 g (91.3 percent yield) of a pale yellow liquid fraction of MBTHP boiling from 155° to 156°C at 0.8 mm Hg.

According to IR, NMR and elementary analyses, the yellow liquid was confirmed to be MBTHP. The MBTHP fraction can be used as the hardener of the composition of this invention.

Having now generally described the invention, a more complete understanding can be obtained by reference to certain specific examples, which are provided herein for purpose of illustration only and are not intended to be limiting in any manner unless otherwise so specified. In the examples, the term "part" means part by weight.

EXAMPLE 1

100 Parts of Epicoat 828 (Trademark of a material manufactured by Shell Oil Company) with an epoxy equivalent of 186.5, 125.5 parts of MBTHP and 1 part of benzyldimethylamine (BDMA) as a hardening accelerator, were uniformly blended at ambient temperatures. The mixture was deaerated under a reduced pressure less than 2 mm Hg to yield the epoxy resin composition of this invention. The composition had a viscosity of about 1 poise at 25°C., and was very easily molded. A hardened resin having excellent strength was obtained when the composition was pretreated at 80°C for four hours and then hardened at 150°C for 10 hours.

In Table 1, the formula and mechanical properties of the composition of this invention containing the MBTHP hardener together with a reference composition containing hexahydrophthalic anhydride (HHPA) or dodecenylsuccinic anhydride (DDSA), is presented.

TABLE I

| Formula | type of hardener | Invention MBTHP | Reference HHPA | DDSA |
|---|---|---|---|---|
| | Epicoate 828 | 100 | 100 | 100 |
| | amount of hardener | 125.5 | 82.6 | 143.7 |
| | accelerator MDMA | 1 | 1 | 1 |
| mechanical strength after hardening | tensile strength (kg/mm$^2$) | 5.5 | 5.3 | 5.2 |
| | bending strength (kg/mm$^2$) | 9.8 | 11.8 | 8.2 |
| | thermal deformation temperature (°C) | 116.3 | 137.1 | 64 |
| | heat crack resistance | 1 | 0 | 5 |

When MBTHP was admixed with the epoxy resin, the thermal deformation temperature was relatively high even though the β-methyl-2-butenyl group is present as a side chain. Although DDSA has the $C_{12}H_{25}$ side chain, the thermal deformation temperature of the composition containing DDSA is about 50°C lower than those compositions containing MBTHP. Since MBTPH has a butenyl side chain in the molecule, good bending resistance is expected for the composition of this invention. The thermal crack resistance of the composition containing MBTHP is higher than those compositions containing HHPA.

The other mechanical properties of the composition of this invention were the same as those of the compositions containing HHPA or DDSA. It is clear that the unsaturated bonds in MBTHP molecules may be easily crosslinked by contacting the molecules with oxygen at high temperatures on a surface while hardening. Hardening is attributed to the cross-linking reactions which occur. Thus, there are no phenomena associated with the physical properties of the hardened products that occur which may be attributed to the presence of unsaturated bonds in the hardened compositions (for example, oxidation deterioration which occurs based on the presence of unsaturated groups).

EXAMPLE 2

A mixture of acid anhydride hardeners (MBTHP and HHPA) in a 1:1 ratio was admixed with an epoxy resin. 77 Parts of MBTHP were admixed with 77 parts of HHPA to prepare the acid anhydride derivative mixture. The mixture was a liquid at room temperature and could be preserved for a long time without any deterioration. The acid anhydride derivative mixture was further admixed with 152.5 parts of Epicoat 828 (epoxy equivalent 184) and 3 parts of a hardening accelerator, BDMA. The mixture was deaerated under reduced pressure (less than 2 mm Hg) to yield the epoxy resin composition of this invention.

When the epoxy resin composition was pretreated at 80°C for 2 hours and hardened at 150°C for 10 hours, a hardened composition possessing great strength was obtained. The thermal deformation temperature of the hardened composition was 121°C., and the other physical strength characteristics thereof were excellent.

EXAMPLE 3

A mixture of acid anhydride hardeners (MBTHP and THPA) in a 1:1 ratio was admixed with an epoxy resin. 76 Parts of MBTHP were admixed with 76 parts of THPA a 60°C to prepare a mixture of acid anhydride derivatives. Although THPA has a melting point of 103°–104°C, when it was admixed with MBTHP, it easily formed a liquid mixture with MBTHP at 50°–60°C. The mixture of acid anhydride derivatives was uniformly admixed with 151.6 parts of Epicoat 828 (epoxy equivalent 184) and 3 parts of BDMA to yield the epoxy resin composition of this invention.

The composition was casted and pretreated at 80°C for 2 hours and was hardened at 160°C for 10 hours to yield a hardened composition possessing great strength. The thermal deformation temperature of the hardened composition was 125°C and the other physical strength characteristics thereof were excellent. Even though the acid anhydride hardener used was solid at room temperature, it was found that when it was admixed with MBTHP, the casting process was rendered very easy.

EXAMPLE 4

An excess of MBTHP was admixed with an epoxy resin. 100 Parts of Epicoat 828 (epoxy equivalent 184) were uniformly admixed with 190.8 parts of MBTHP and 3.5 parts of BDMA to yield the epoxy resin composition of this invention. In this case, MBTHP was present in a 50 percent excess of the stoichiometric amount required to react with the epoxy resin. The mixture was pretreated at 80°C for 4 hours and then was hardened at 160°C for 10 hours to yield a hardened epoxy resin composition possessing great strength. The thermal temperature of the hardened product was 82.8°C, which was about 30°C lower than the thermal deformation temperature of the epoxy composition containing stoichiometric amounts of epoxy resin and MBTHP (Example 1).

EXAMPLE 5

A small amount of MBTHP was admixed with the epoxy resin. 100 Parts of Epicoat 828 (epoxy equivalent 184) were uniformly admixed with 63.6 parts of MBTHP and 1.6 parts of BDMA to yield the epoxy composition of this invention. The amount of MBTHP was one-half (0.5) of the stoichiometric amount required to react with an equivalent of the epoxy resin. The mixture was pretreated at 80°C. for 2 hours and was hardened at 150°C for 10 hours to yield a hardened epoxy resin composition possessing great strength. The thermal deformation temperature of the hardened composition was 93.2°C, which was about 20°C lower than the thermal deformation temperature of the epoxy composition containing stoichiometric amounts of epoxy resin and MBTHP (Example 1). It is clear from the results of Examples 4 and 5, that it is preferable to admix about one equivalent of MBTHP per equivalent of epoxy present in the epoxy resin (when only MBTHP was used as the hardener).

Having now fully described the invention, it will be apparent to one of ordinary skill in the art that many changes and modifications can be made thereto without departing from the spirit or scope of the invention as set forth herein. According,

What is claimed as new and intended to be covered by letters patent is:

1. An epoxy resin composition which comprises a 1,2-polyepoxide resin which is cured with 0.1–10 moles per mole of epoxy in the epoxy resin of 3-($\beta$-methyl-2-butenyl)-5-methyl-1,2,3,6-tetrahydrophthalic anhydride.

2. The epoxy resin composition of claim 1, wherein 0.2–2 moles of 3-($\beta$-methyl-2-butenyl)-5-1,2,3,6-tetrahydrophthalic anhydride is admixed with the epoxy resin.

3. The epoxy resin composition of claim 1, wherein a substantial amount of 3-($\beta$-methyl-2-butenyl)-5-methyl-1,2,3,6-tetrahydrophthalic anhydride is used together with another anhydride hardener.

* * * * *

UNITED STATES PATENT OFFICE
CERTIFICATE OF CORRECTION

PATENT NO. : 3,873,501
DATED : March 25, 1975
INVENTOR(S) : MOTOO SAGA

It is certified that error appears in the above-identified patent and that said Letters Patent are hereby corrected as shown below:

On the cover page, Column 1, after "[21] Appl.No. 462,926" insert --[30] Foreign Application Priority Date Oct. 8, 1971    Japan . . . . . . . 77932/71.--

Signed and Sealed this sixteenth Day of September 1975

[SEAL]

Attest:

RUTH C. MASON
Attesting Officer

C. MARSHALL DANN
Commissioner of Patents and Trademarks